(12) United States Patent
Brandt et al.

(10) Patent No.: US 10,821,810 B2
(45) Date of Patent: Nov. 3, 2020

(54) FUEL GAS-OPERATED VEHICLE HEATER (71) Applicant: Eberspächer Climate Control Systems GmbH & Co. KG, Esslingen (DE)

(72) Inventors: Samuel Brandt, Esslingen (DE); Andreas Kaupert, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 127 days.

(21) Appl. No.: 15/459,205

(22) Filed: Mar. 15, 2017

(65) Prior Publication Data

US 2017/0267064 A1 Sep. 21, 2017

(30) Foreign Application Priority Data

Mar. 17, 2016 (DE) .................. 10 2016 104 935
Apr. 19, 2016 (DE) .................. 10 2016 107 207

(51) Int. Cl.
*B60H 1/22* (2006.01)
*F23D 14/22* (2006.01)
*F23N 1/00* (2006.01)

(52) U.S. Cl.
CPC .......... *B60H 1/2206* (2013.01); *F23D 14/22* (2013.01); *F23N 1/002* (2013.01); *B60H 2001/2231* (2013.01); *B60H 2001/2256* (2013.01); *B60H 2001/2271* (2013.01); *B60H 2001/2284* (2013.01); *F23K 2400/201* (2020.05); *F23N 2235/18* (2020.01); *F23N 2241/14* (2020.01)

(58) Field of Classification Search
USPC ..................................... 237/12.3 C
See application file for complete search history.

(56) References Cited

U.S. PATENT DOCUMENTS 5,056,501 A * 10/1991 Ida ................. B60H 1/2212
126/110 B
5,788,150 A * 8/1998 Bittmann ............ B60H 1/2209
165/169
7,255,100 B2 * 8/2007 Repper ................. F23N 1/005
126/39 BA (Continued)

FOREIGN PATENT DOCUMENTS

AT       388 988 B     9/1989
DE       39 24 664 C1  10/1990
DE       39 28 352 A1  2/1991

(Continued)

*Primary Examiner* — Steven B McAllister
*Assistant Examiner* — John E Bargero
(74) *Attorney, Agent, or Firm* — McGlew and Tuttle, P.C.

(57) ABSTRACT

A fuel gas-operated vehicle heater includes a burner area with a combustion chamber (60) formed in a combustion chamber housing (58). The combustion chamber housing (58) includes a circumferential wall (62) defining the combustion chamber (60) in relation to a housing longitudinal axis radially outwards and a bottom area (64) axially defining the combustion chamber (60). The bottom area (64) has a fuel gas feed chamber (116) between a first bottom wall (106) defining the combustion chamber (60) and a second bottom wall (112). A fuel gas feed line (118) opens into the fuel gas feed chamber (116). A fuel gas inlet opening assembly is provided in the first bottom wall (106) for the entry of fuel gas from the fuel gas feed chamber (116) into the combustion chamber (60).

20 Claims, 8 Drawing Sheets

(56) References Cited

U.S. PATENT DOCUMENTS

2014/0090389 A1\* 4/2014 Stuttaford ................ F23R 3/16
60/772

FOREIGN PATENT DOCUMENTS

| DE | 10 2005 003 653 A1 | 8/2006 |
| DE | 10 2008 012 389 A1 | 9/2009 |
| DE | 10 2012 211 932 B3 | 10/2013 |
| DE | 10 2012 009 866 A1 | 11/2013 |
| DE | 10 2013 220 655 A1 | 4/2015 |
| EP | 0 769 399 A2 | 4/1997 |

\* cited by examiner

FUEL GAS-OPERATED VEHICLE HEATER

CROSS REFERENCE TO RELATED APPLICATIONS

This application claims the benefit of priority under 35 U.S.C. § 119 of German Applications DE 10 2016 104 935.2 filed Mar. 17, 2016 and DE 10 2016 107 207.9 filed Apr. 19, 2016, the entire contents of which are incorporated herein by reference.

FIELD OF THE INVENTION

The present invention pertains to a fuel gas-operated vehicle heater, which can be used, for example, as a parking heater or auxiliary heater in a vehicle and comprises a burner area with a combustion chamber formed in a combustion chamber housing.

BACKGROUND OF THE INVENTION

The vehicle heaters that can be used as parking heaters or/and auxiliary heaters in a vehicle are generally configured such that they can be operated with the same fuel as a drive assembly provided in such a vehicle. Drive assemblies are generally fed with liquid fuel, so that correspondingly liquid fuel is also fed to vehicle heaters provided in connection with such drive assemblies. In heaters which are configured, for example, as vaporizing burners, the liquid fuel is fed into a porous evaporator medium, which is generally provided in the bottom area of a combustion chamber housing axially defining a combustion chamber. The fuel initially fed in the liquid form is released from the porous evaporator medium in gas form and is mixed with the combustion air which has also been introduced into the combustion chamber for providing a combustible mixture.

SUMMARY OF THE INVENTION

An object of the present invention is to provide a fuel gas-operated vehicle heater that ensures a reliable combustion of the fuel fed in gas form to the heater in a configuration which is simple to achieve.

According to the present invention, this object is accomplished by a fuel gas-operated vehicle heater, comprising a burner area with a combustion chamber formed in a combustion chamber housing, wherein the combustion chamber housing comprises a circumferential wall defining the combustion chamber in relation to a housing longitudinal axis radially outwards and a bottom area axially defining the combustion chamber, wherein the bottom area has a fuel gas feed chamber between a first bottom wall defining the combustion chamber and a second bottom wall, wherein a fuel gas feed line opens into the fuel gas feed chamber and wherein a fuel gas inlet opening assembly is provided in the first bottom wall for the entry of fuel gas from the fuel gas feed chamber into the combustion chamber.

In the vehicle heater according to the present invention, a fuel gas feed chamber, into which the fuel gas, for example, natural gas, is introduced, and from which the fuel gas can enter into the combustion chamber for uniform mixing with the air introduced into the combustion chamber via the fuel gas inlet opening assembly, is provided in the bottom area of the combustion chamber housing corresponding to the porous evaporator medium provided in case of vehicle heaters operated with liquid fuel. Thus, structural components, which are essentially also used for liquid-fuel-operated vehicle heaters, can be used for the vehicle heater configured according to the present invention. A change needs to be made essentially only in the bottom area of the combustion chamber housing for the feed of fuel into the combustion chamber. Other system areas, e.g., the circumferential wall and especially also the system areas provided for feeding air into the combustion chamber, may be structurally identical to the system areas provided in case of liquid-fuel-operated heaters.

For ensuring a uniform entry of fuel gas over the cross section of the combustion chamber, it is suggested that the fuel gas inlet opening assembly have a plurality of fuel gas inlet openings. The fuel gas inlet openings are preferably arranged essentially symmetrically in relation to the housing longitudinal axis in this case. A symmetrical arrangement in the sense of the present invention may be, for example, a point-symmetrical or mirror-symmetrical arrangement. Also, a, for example, annular distribution of a plurality of fuel gas inlet openings with essentially uniform circumferential spacing is such a symmetrical arrangement in the sense of the present invention.

In order to be able to ignite the mixture of air and fuel gas formed in the combustion chamber, it is suggested that an ignition element, for example, a glow-type ignition pin (a glow plug), preferably extending essentially parallel to the first bottom wall, be provided at an axially spaced location to the bottom area.

For the feed of air needed for combustion with the fuel gas, a plurality of air inlet openings may be provided in the circumferential wall for the entry of air into the combustion chamber.

A defined combustion characteristic in the combustion chamber can be achieved according to an advantageous aspect of the vehicle heater according to the present invention by a density of a number of openings (an opening density) or/and opening size of the air inlet openings in the axial area of the ignition element being lower than in an axial area at a greater distance from the bottom area. For example, the air inlet openings may be arranged in this connection in a plurality of air inlet opening rings provided in various axial areas of the circumferential wall and each comprising at least one, and preferably a plurality of air inlet openings following each other in the circumferential direction. Because the ignition element, for example, a glow-type ignition pin (glow plug), must at first be preheated in a start phase of the combustion, it is advantageous when an air inlet opening ring provided in the axial area of the ignition element has a lower number of air inlet openings than at least one air inlet opening ring provided at a greater distance from the bottom area. It is thus ensured that the air introduced into the combustion chamber does not flow excessively around the ignition element during this preheating phase and is thereby cooled.

Especially in case of using fuel gas as fuel in a vehicle heater, it is necessary because of safety standards to very rapidly detect whether the mixture of fuel gas and air formed in a combustion chamber has ignited. Therefore, it is suggested that a flame sensor, preferably a temperature sensor, preferably extending essentially parallel to the first bottom wall, be provided at an axially spaced location from the bottom area. The flame sensor is thus provided relatively close to that area, at which the combustion will start during the start phase of the combustion operation, so that the appearance of a flame is detected immediately. There are no considerable time delays because of the need to heat other system areas of the vehicle heater and to have to determine the heating thereof.

A direct interaction of the flame sensor with that area, in which the ignition or the combustion will occur in the combustion chamber, can be achieved by the ignition element and the flame sensor being arranged with an essentially identical axial distance from the bottom area.

The vehicle heater according to the present invention can further be configured such that an air feed chamber enclosing the combustion chamber housing in the area of the circumferential wall or/and of the bottom area and receiving air from a blower is provided, or/and that a flame diaphragm is carried on the circumferential wall, or/and that a flame tube is connected to the circumferential wall, preferably made integral therewith. Such a combustion also ensures that components and system areas, which are also used for heaters operated with liquid fuel, may essentially be used for the vehicle heater. In an embodiment that is especially advantageous in terms of the thermal load of the flame sensor, it is suggested that the axial distance of the flame sensor to the bottom area be shorter than the axial distance of the flame sensor to the flame diaphragm.

For a bottom area of the combustion chamber housing that is structurally simple to configure, it is suggested that the bottom area comprise a first bottom part with the first bottom wall and with a circumferential wall and a second bottom part with the second bottom wall and with a circumferential wall. In this case, the second bottom part can be inserted into the first bottom part and the two bottom parts can be connected to each other in the area of their circumferential walls.

In order to ensure an as uniform as possible introduction of fuel gas from the fuel gas feed chamber into the combustion chamber, it is suggested that no fuel gas inlet opening of the fuel gas inlet opening assembly be located opposite a fuel gas junction area into the fuel gas feed chamber.

The present invention further pertains to a vehicle heating system with a fuel gas-operated vehicle heater according to the present invention and with a fuel gas feed system for feeding fuel gas to the vehicle heater.

In this case, the fuel gas feed system may comprise:
a fuel gas storage device,
a blocking valve assembly for blocking and releasing a fuel gas feed line leading to the vehicle heater,
a pressure reducer assembly,
a fuel gas quantity-setting valve assembly.

In order to ensure a reliable feeding of the vehicle heater with fuel gas while complying with the current safety standards, it is further suggested that
the blocking valve assembly comprise two blocking valves arranged in series, or/and
the pressure reducer assembly comprise a first pressure reducer for reducing the fuel gas pressure from a storage pressure to a first pressure level and a second pressure reducer for reducing the fuel gas pressure from the first pressure level to a second pressure level, or/and
the fuel gas quantity-setting valve assembly comprise a plurality of fuel gas quantity-setting valves arranged parallel to one another, wherein each fuel gas quantity-setting valve can be switched between a blocked position and a released position, wherein preferably at least two fuel gas quantity-setting valves have different quantities of fuel gas flowing through in their released position, or the fuel gas quantity-setting valve assembly comprises a proportional valve.

Especially if the vehicle heater to be provided according to the present invention is fed with the same fuel gas, which shall also be used for combustion in an internal combustion engine, it is suggested that a fuel gas line leading away from the fuel gas storage device be branched into a first fuel gas line area leading to the vehicle heater and a second fuel gas line area leading to a fuel gas-operated vehicle internal combustion engine.

The present invention further pertains to a method for operating a fuel gas-operated vehicle heater, for example, a vehicle heater configured according to the present invention in a vehicle heating system according to the present invention. In this method, first a combustion chamber may be flushed with air in a start phase of the combustion operation. For example, in case of continued flushing with air, an ignition element can then be energized in order to create ignition conditions in the area of this ignition element. When these ignition conditions are present, i.e., for example, a predefined duration after the beginning of the energizing of the ignition element, fuel gas can be introduced into the combustion chamber. In an end phase of the combustion operation, the ignition element can be energized again and the fuel gas feed can be ended for flushing out the combustion chamber with continued air feed into the combustion chamber. By energizing the ignition element in the end phase of the combustion operation, it is ensured that the combustion lasts as long as possible in case of an increasingly lean mixture of fuel gas and combustion air and thus an as small as possible amount of uncombusted fuel gas is emitted to the environment. Further, as an alternative or in addition, provisions may be made in this method for the air pressure of the air fed to a combustion chamber to be higher than a gas pressure of the fuel gas fed to the combustion chamber during the combustion operation. It can thus be ensured that a fuel gas leak into the flow path of the air to the combustion chamber is prevented because of the air pressure exceeding the fuel gas pressure.

Because the ignition element first needs some time, for example, a few seconds, to reach such a high temperature that it ensures the combustion even of an increasingly lean mixture when energizing the ignition element in the end phase of the combustion operation, it is suggested that the fuel gas feed be ended after the beginning of the energizing of the ignition element in the end phase of the combustion operation.

Especially when using fuel gas as fuel for a vehicle heater, it is necessary to ensure that a state, in which fuel gas is introduced, but combustion does not take place, lasts as briefly as possible. Therefore, it is suggested that if the appearance of a flame is not detected in a predefined time, and preferably approximately 10 seconds, after the start of the fuel gas feed in the start phase of the combustion operation, the fuel gas feed is ended, preferably with continued air feed or/and continued energizing of the ignition element.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
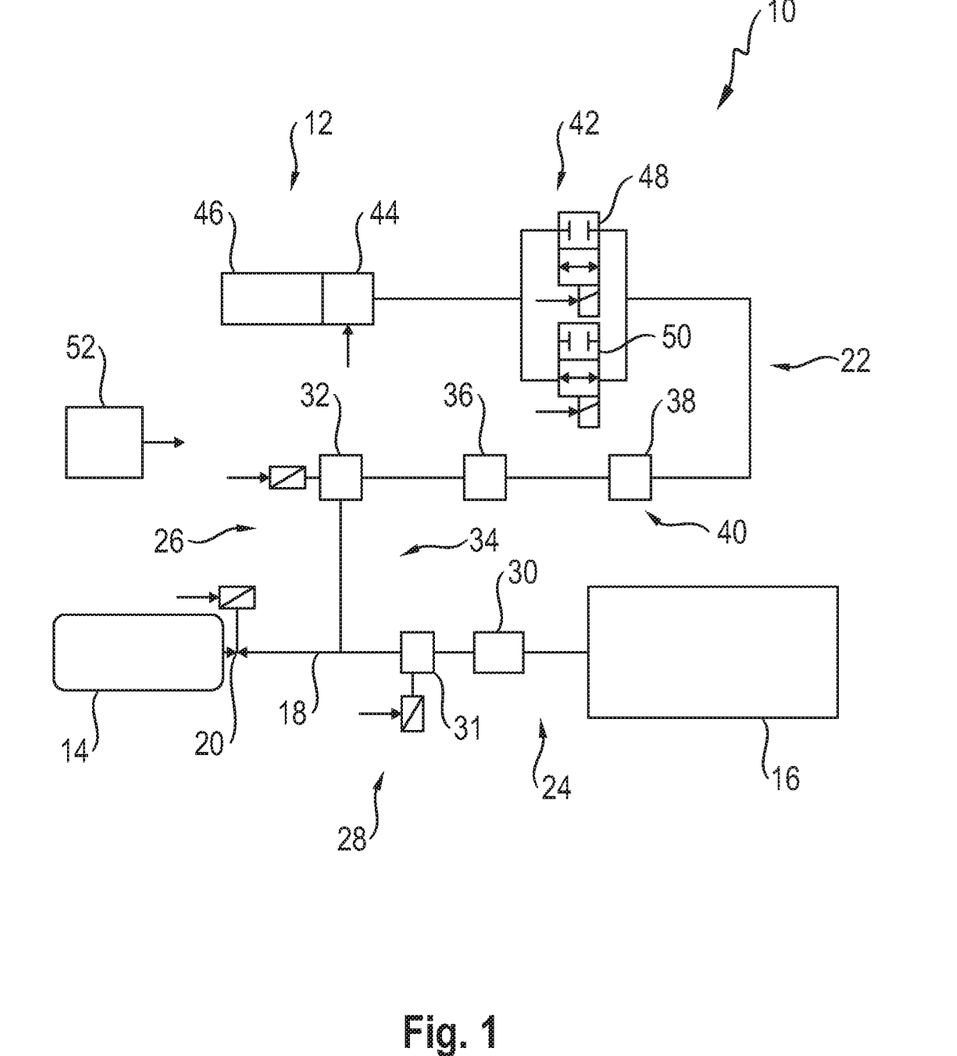
FIG. 1 is a block-diagram view showing a configuration of a vehicle heating system with a fuel gas-operated vehicle heater.

Referring to the drawings, a vehicle heating system is generally designated by 10 in FIG. 1. The vehicle heating system 10 comprises a vehicle heater 12 as an essential component, which heater is operated with fuel gas and is fed with fuel gas stored in a fuel gas storage device 14 of a vehicle. The fuel gas stored in the fuel gas storage device 14 is also used as fuel for an internal combustion engine 16 of a vehicle equipped with the vehicle heating system 10. A blocking valve 20, for example, a solenoid valve, by means of which the fuel gas storage device 14 can, in principle, be blocked against the release of fuel gas, is arranged in a fuel gas line 18 leading away from the fuel gas storage device 14. The fuel gas line 18 leading away from the fuel gas storage device 14 branches into a first fuel gas line area 22 leading to the vehicle heater 12 and a second fuel gas line area 24 leading to the internal combustion engine 16. Thus, the fuel gas line 18 leading away from the fuel gas storage device together with the first fuel gas line area 22 forms a fuel gas feed line 26 leading to the vehicle heater 12. Similarly, the fuel gas line 18 together with the second fuel gas line area 24 leading to the internal combustion engine 16 forms a fuel gas feed line 28, via which fuel gas can be sent to the internal combustion engine 16.

The fuel gas is stored, for example, in gas form under very high pressure, for example, approximately 250 bar, in the fuel gas storage device 14. Depending, e.g., on the fuel gas used, it may also be stored in liquid form. A pressure reducer 30 is provided in the second fuel gas line area 24 in order to feed the internal combustion engine 16 with a suitable fuel gas pressure via the fuel gas feed line 28. A blocking valve 31, e.g., a solenoid valve, may be associated with the pressure reducer 30 in order to be able to block the second fuel gas line area 24 if the vehicle heater 12 but not the internal combustion engine 16 shall be fed with fuel gas, when the blocking valve 20 associated with the fuel gas storage device 14 is open and fuel gas shall be sent via the first fuel gas line area 22 to the vehicle heater 12.

Another blocking valve 32, for example, a solenoid valve, is also provided downstream of the blocking valve 20 in the first fuel gas line area 22 in order to be able to block the first fuel gas line area 22, when fuel gas shall be sent to the internal combustion engine 16, but not to the vehicle heater 12. The branching of the fuel gas line 18 into the two fuel gas line areas 22, 24 thus lies in the flow direction between the two blocking valves 20, 32 and 20, 31, respectively.

Two pressure reducers 36, 38 which together form a pressure reducer assembly 40, are provided in series downstream of the two blocking valves 20, 32, forming a blocking valve assembly 34. The storage pressure of the fuel gas present in the upstream line area in relation to this first pressure reducer is reduced to a first pressure level by the first pressure reducer 36. As already mentioned above, the storage pressure may be approximately 250 bar. The first pressure level may be in a range of 5 bar to 10 bar, preferably approximately 7 bar. The fuel gas pressure is reduced by the second pressure reducer 38 of the pressure reducer assembly 40 to a second pressure level, which may be, for example, approximately 50 mbar. It should be pointed out here that the preceding pressure data are related to ambient pressure, i.e., they reflect the pressure above the ambient pressure.

A fuel gas quantity-setting valve assembly, generally designated by 42, is provided downstream of the pressure reducer assembly 40. The quantity of gas needed for a combustion operation is introduced from the first fuel gas line area 22 via this fuel gas quantity-setting valve assembly into a burner area, generally designated by 44, of the vehicle heater 12, to which air needed for combustion with the fuel gas is further fed via an air feed unit (not shown), for example, a side channel blower. The heat developing during the combustion of a mixture of fuel gas and air in the burner area 44 can be transferred in a heat exchanger area 46 to a medium to be heated, for example, the air to be introduced into a vehicle interior or the liquid refrigerant flowing into a refrigerant circuit of the internal combustion engine 16.

In the example of a vehicle heating system 10 shown in FIG. 1, the fuel gas quantity-setting valve assembly 42 comprises two fuel gas quantity-setting valves 48, 50 connected parallel to one another, for example, solenoid valves. They may have a valve gate which is prestressed, for example, by spring force into a blocked position, which can be set into a released position by energizing a corresponding electromagnet array against the spring force. In the state shown in FIG. 1, for example, the fuel gas quantity-setting valve 48 is in its blocked position, while the fuel gas quantity-setting valve 50 is in its released position.

The two fuel gas quantity-setting valves 48, 50 may be configured, for example, such that they each have or provide the same quantity of fuel gas flowing through if their respective valve gates are in the released position. Three different operating states or fuel gas quantity feed states may thus be obtained. If both fuel gas quantity-setting valves 48, 50 are in their blocked position, no fuel is sent to the burner area 44. If one of the two fuel gas quantity-setting valves 48, 50 is switched into its released position, a predefined quantity of fuel gas is fed into the burner area 44, so that the vehicle heater 12 can be operated with lower heat output in a first heat output level. If both fuel gas quantity-setting valves 48, 50 are brought into their released position, twice the quantity of fuel gas is sent into the burner area 44, so that the vehicle heater 12 can be operated at a second heat output level with higher heat output. In an alternative embodiment, the two fuel gas quantity-setting valves can be configured such that, for example, the fuel gas quantity-setting valve 50 provides twice the quantity of fuel gas flowing through as the fuel gas quantity-setting valve 48. Depending on whether only the fuel gas quantity-setting valve 48, only the fuel gas quantity-setting valve 50 or both fuel gas quantity-setting valves 48, 50 are brought into their released position, three different quantities of fuel gas can thus be fed into the burner area 44, so that the vehicle heater 12 can be operated at three different heating output levels with different heating outputs. The heating output of the lowest heating output level then corresponds to approximately ⅓ of the maximum heating output provided in the highest heating output level. The heating output in the middle heating output level corresponds to approximately ⅔ of this maximum heating output.

The various system areas to be operated or actuated during the operation of the vehicle heating system are under the actuation of an actuating unit generally designated by 52. This actuating unit can be classified, for example, into an actuating unit area and into a control device, which actuates the system areas to be operated essentially only in interaction with the vehicle heater 12, i.e., the blocking valve 32, the fuel gas quantity-setting valve assembly 42 and the burner area 44. Another actuating unit area may be provided in association with the system areas essentially associated with the vehicle and with the internal combustion engine 16, i.e., with the blocking valve 20 and the blocking valve 31 provided in association with the pressure reducer 30 and with the second fuel gas line area 24.

Figure 2:
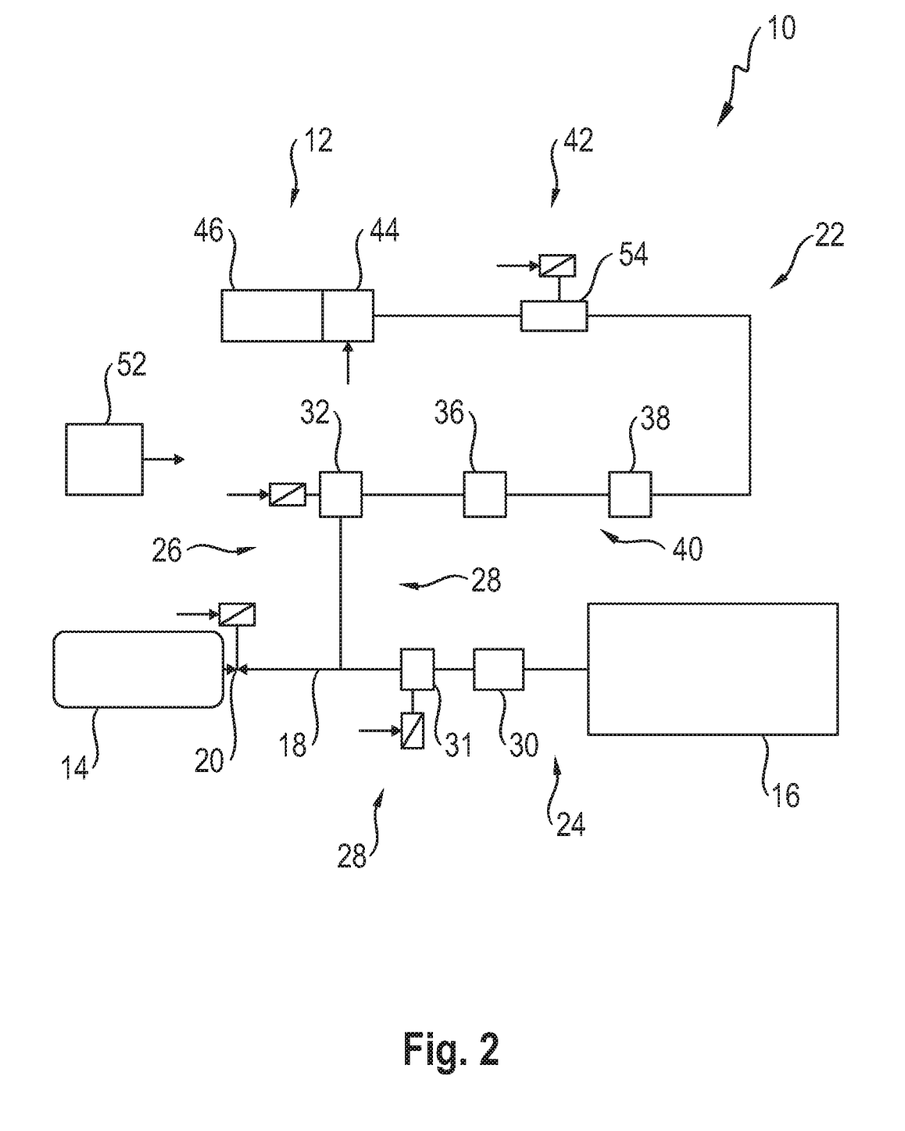
FIG. 2 is a view corresponding to FIG. 1 of an alternative vehicle heating system with a fuel gas-operated vehicle heater.

The fuel gas quantity-setting valve assembly 42 comprises a fuel gas quantity-setting valve that is configured as a proportional valve in the vehicle heating system 10 shown in FIG. 2. This valve is under the control of the actuating unit 52 and can be actuated corresponding to the necessary quantity of fuel gas in order to feed this quantity of gas, which is needed for a respective heating output level of the vehicle heater 12 to be set, into the burner area 44, as a result of which a better modulability of the gas flow can be achieved.

The configuration of the fuel gas-operated vehicle heater 12 is described below with reference to FIGS. 3 through 8 on the basis of an air heater, i.e., a heater configured for heating the air to be introduced into a vehicle interior.

Figure 3:
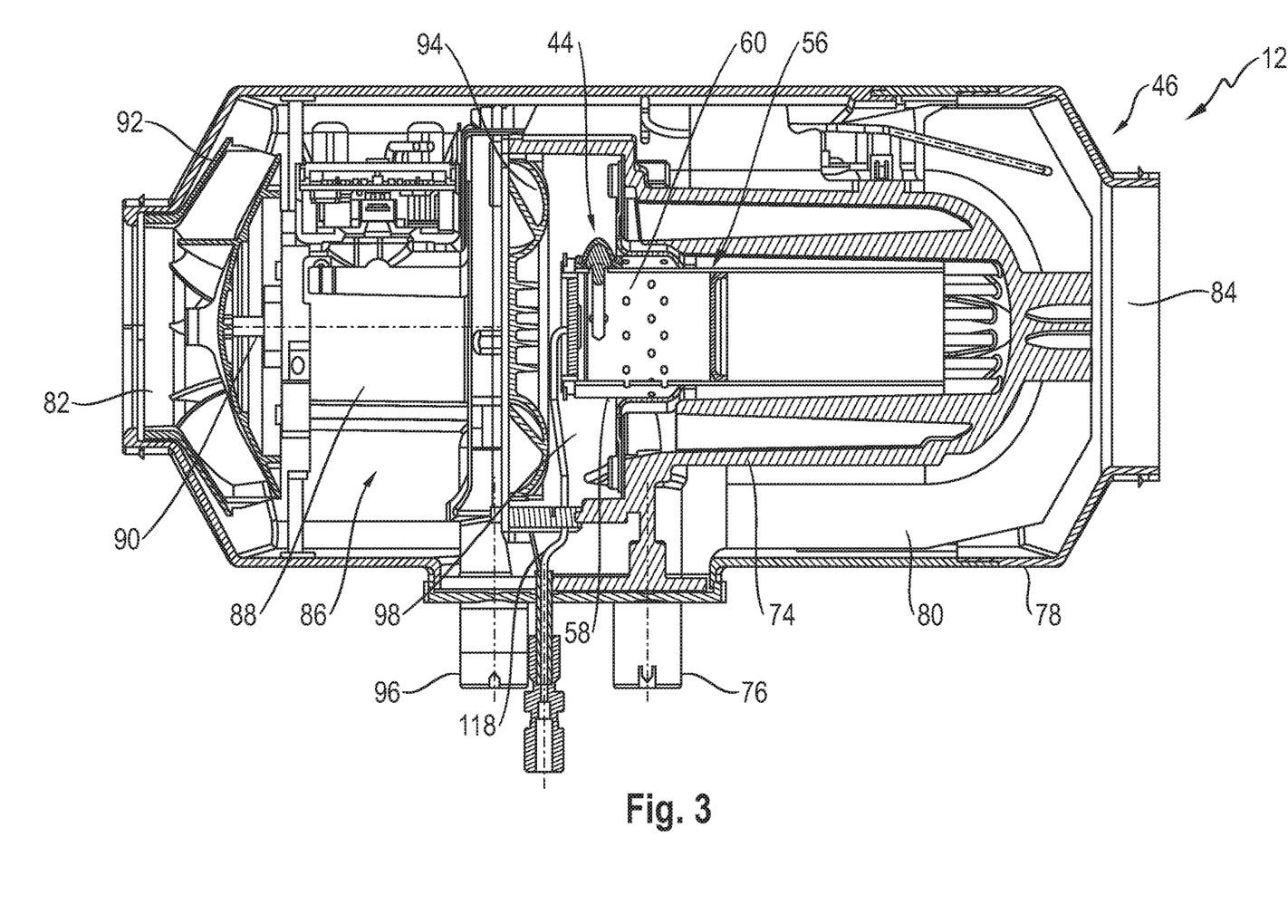
FIG. 3 is a longitudinal sectional view of a vehicle heater operated with fuel gas.

The vehicle heater 12 comprises as a central assembly unit of the burner area 44 a combustion chamber assembly unit that is generally designated by 56. The combustion chamber assembly unit 56, shown in detail in FIGS. 4 and 5, comprises a combustion chamber housing 58 with a circumferential wall 62 defining a combustion chamber 60 in relation to a housing longitudinal axis L radially outwards. A flame tube 66, which is formed integrally with the combustion chamber housing 58 in the example shown, is connected to the circumferential wall 62 of the combustion chamber housing 58. A flame diaphragm 66 with an opening 70 formed centrally therein, for example, is carried on the circumferential wall 62 or the flame tube 66. A fastening flange 72, with which the combustion chamber assembly unit 56 is fixed, for example, by bolting, to an essentially pot-like heat exchanger housing 74, which can be seen in FIG. 3, is provided on the outside of the circumferential wall 62.

The flame tube 66 extends in this heat exchanger housing 74, so that combustion waste gases leaving the flame tube 66 at its end area facing away from the combustion chamber 60 flow along on the inside of the heat exchanger housing 74 and leave this heat exchanger housing via a waste gas outlet 76. The heat exchanger housing 74 of the heat exchanger area 46, which is schematically shown in FIG. 1, can be provided on its inside and its outside with heat transfer ribs in order to increase the interaction surface with the combustion waste gases, on the one hand, and the interaction surface with the air to be heated, i.e., hot air, on the other hand.

The heat exchanger housing 74 is in turn carried in a heater housing 78, so that an essentially annular air flow space 80 is formed between an air inlet opening 82 and an air outlet opening 84 between the outside of the heat exchanger housing 74 and the heater housing 78. The two openings 82, 84 can be arranged concentrically to one another and to the housing longitudinal axis L of the combustion chamber assembly unit 58.

A blower 86, which can be seen in FIG. 1, with a blower motor 88 is carried on the heat exchanger housing 74. A feed wheel 92, which during its rotation feeds the air to be heated through the air flow space 80 towards the air outlet opening 84, is carried at an axial end area of a rotor shaft 90 of the blower motor 88, which axial end area faces away from the combustion chamber assembly unit 56. A feed wheel 94 of a blower area, generally called a side channel blower as well, is provided at the axial end area of the rotor shaft 90 facing the combustion chamber assembly unit 56 and also the heat exchanger housing 74 for feeding the air needed for combustion towards the combustion chamber assembly unit 56. This air enters via an air inlet pipe 96 into an annular feed channel, opposite which the feed wheel 94 is axially located. Via a discharge area, not shown, the air needed for combustion enters into an air feed chamber 98, which encloses the combustion chamber housing 58 of the combustion chamber assembly unit 56 in the area of the circumferential wall 62 and of the bottom area 64.

The air that is fed into the air feed chamber 98 by the feed wheel 94 also reaches a volume area between the fastening flange 72 and the circumferential wall 62 and enters into the combustion chamber 60 via a plurality of air inlet openings 100 provided in the circumferential wall 62. The air inlet openings 100 are arranged in the circumferential wall 62 in a plurality of rings 102 following one another in the axial direction. In this case, the number of air inlet openings 100 in the rings 102 varies in a manner that will be described in detail below such that the number of such air inlet openings 100 in an area of the circumferential wall 62 located closer to the bottom area 64 is lower than in an axial area at a greater distance from the bottom area 64.

Figure 5:
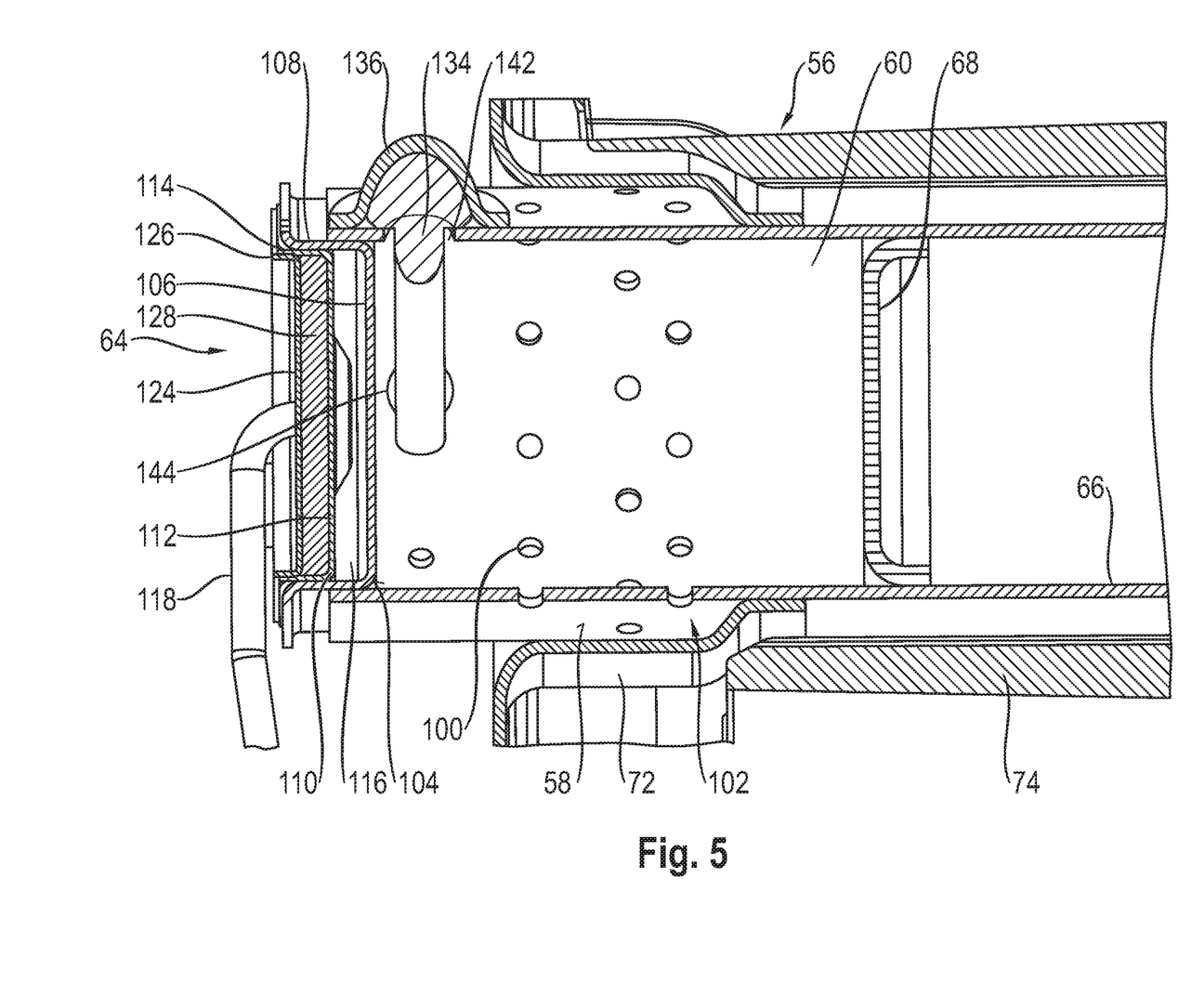
FIG. 5 is a longitudinal sectional view of a combustion chamber assembly unit of FIG. 4 in a detail view, cut in a plane not containing the housing longitudinal axis.
Figure 6:
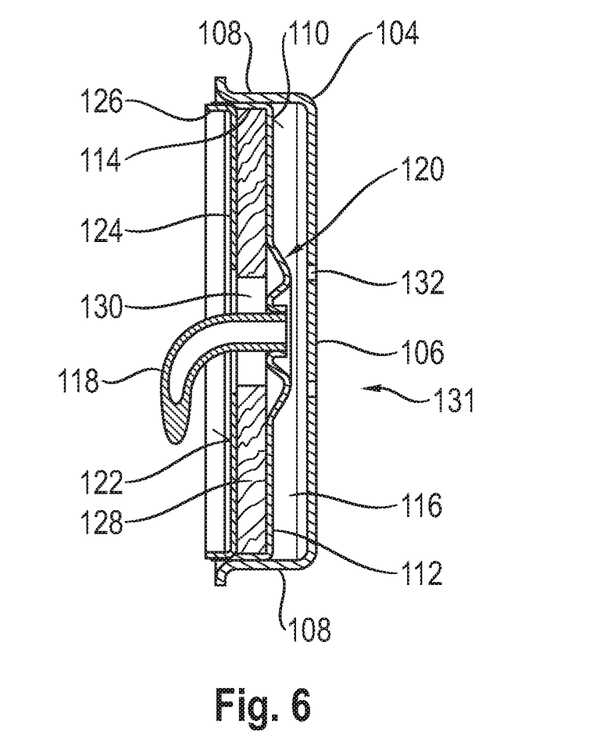
FIG. 6 is a longitudinal sectional view of a bottom area of the combustion chamber assembly unit in FIG. 4.

The bottom area 64 to be seen in more detail in FIGS. 5 and 6 comprises a first, essentially pot-like bottom part 104 which has a first bottom wall 106 and a circumferential wall 108 integral with it. A second bottom part 110, which has a second bottom wall 112 and a circumferential wall 114, is inserted into the first bottom part 104. The two bottom parts 104, 110 may be permanently connected to one another by welding or soldering, for example, in the area of their circumferential walls 108, 114 and are preferably configured as shaped sheet metal parts for this purpose.

A fuel gas feed chamber 116 is formed between the two bottom walls 106, 112. The fuel gas is introduced into this fuel gas feed chamber via a fuel gas feed line 118. An opening area 120, into which the fuel gas feed line 118 is inserted and to which, for example, it is permanently and especially gastightly connected by soldering or welding, is formed in a central area of the second bottom wall 112. As can be seen in FIG. 3, the fuel gas feed line 118 passes through the heater housing 78, the heat exchanger housing 74 and thus the air flow space 80 formed between them, and passes through the air feed chamber 98 as well.

A third bottom part 122 comprises a third bottom wall 124 and a circumferential wall 126 and is inserted into the second bottom part 110. A layer of insulating material 128, which has an opening 130 for the flowing of the fuel gas feed line 118, is provided between the second bottom wall 112 and the third bottom wall 124. The layer of insulating material 128 insulates the bottom area 64 and thus also the entire combustion chamber assembly unit 56 in the axial direction.

A fuel gas inlet opening assembly 131 is provided in the first bottom wall 106 of the first bottom part 104 for the entry of the fuel gas fed via the fuel gas feed line 118 from the fuel gas quantity-setting valve assembly 42 into the combustion chamber 60. This fuel gas inlet opening assembly 131 comprises a plurality of fuel gas inlet openings 132, which are arranged, for example, essentially symmetrical to the housing longitudinal axis L in a regular pattern. In the example shown in FIG. 7, a point-symmetrical arrangement of the fuel gas inlet openings 132 is provided. Other arrangements with an essentially regular arrangement pattern, which ensure a uniform introduction of fuel gas into the combustion chamber 60, may be provided as well. The fuel gas inlet openings 132 may also be arranged distributed in an irregular pattern, for example, in a circular arrangement with varying distances or otherwise in an irregular pattern over the bottom part 104.

Figure 7:
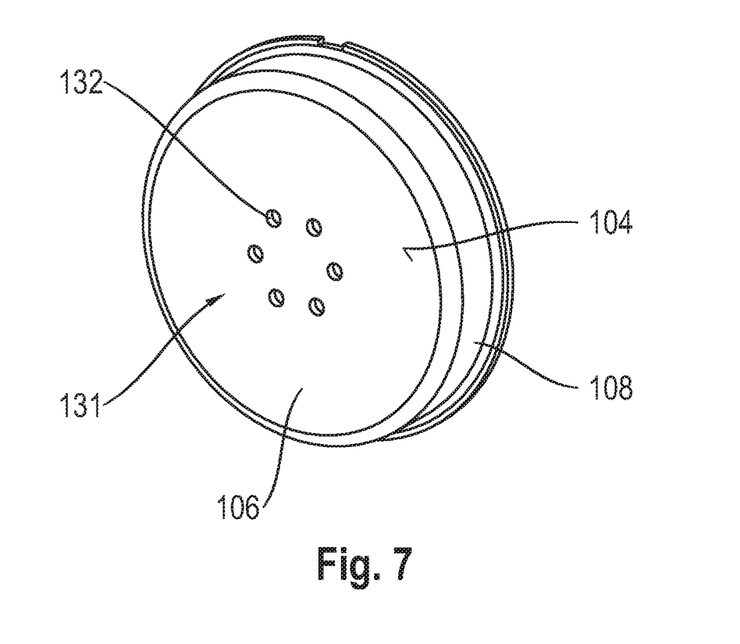
FIG. 7 is a perspective view of the bottom area of FIG. 6.

Especially advantageous is in this connection the configuration of the fuel gas inlet opening assembly 131, which can be seen in FIGS. 6 and 7, in which no fuel gas inlet opening 132 is located opposite the junction area of the fuel gas feed line 118, i.e., for example, the end area of the fuel gas feed line 118, which is essentially oriented in the direction of the housing longitudinal axis L and provides a gas outlet opening, in the main gas outlet direction, i.e., e.g., in the direction of the housing longitudinal axis. Thus, the fuel gas being released from the fuel gas feed line 118 first appears on the first bottom wall 106, is deflected by same and distributed in the fuel gas feed chamber 116. A direct, essentially axial flowing of the fuel gas through the fuel gas feed chamber 116 is thus not possible.

Figure 8:
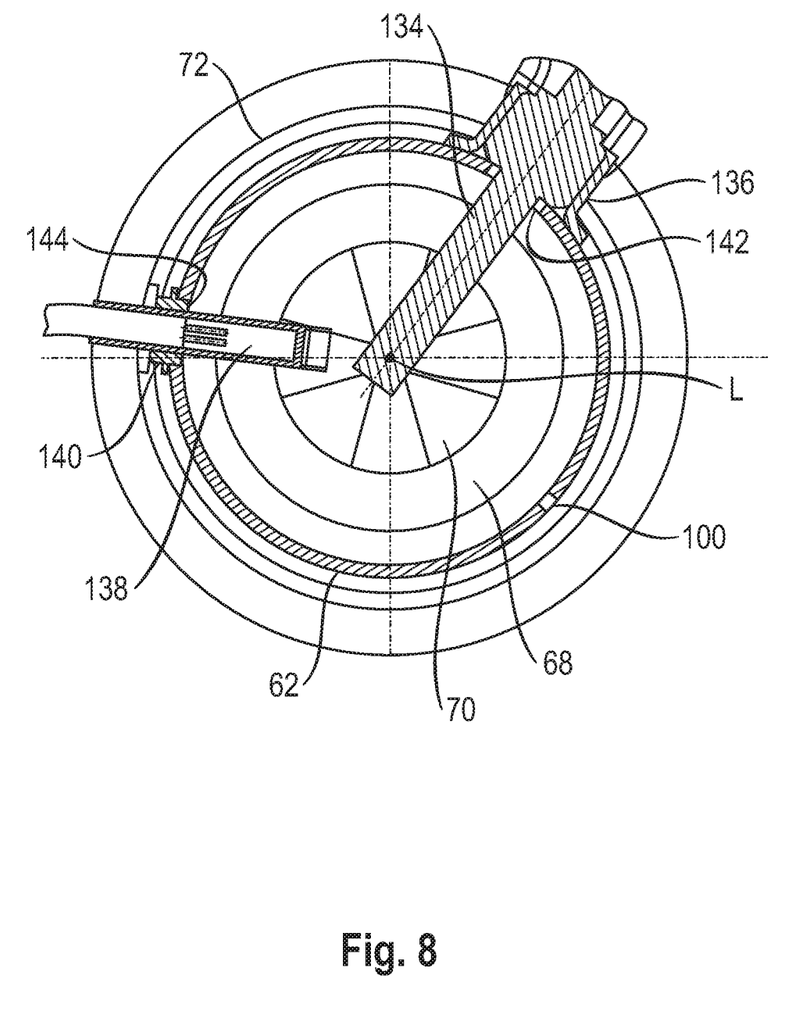
FIG. 8 is a cross-sectional view of the combustion chamber assembly unit of FIG. 4, cut along a line VIII-VIII in FIG. 4.

An ignition element 134, which extends into the combustion chamber 60, is carried on the circumferential wall 62. This ignition element 134, which is configured as a glow plug, for example, extends, at a relatively short distance to the first bottom wall 106, essentially parallel thereto into the combustion chamber 60. For example, as this is illustrated in FIG. 8, the ignition element 134 may extend essentially radially in relation to the housing longitudinal axis L. A sleeve-like carrier 136, in which the ignition element 134 is permanently carried also for providing an essentially gastight sealing of the combustion chamber 60, may be carried on the outside of the circumferential wall 62. A flame sensor 138 extending into the combustion chamber 60 is carried on the circumferential wall 62, essentially in the same axial area as the ignition element 134. For this purpose, a sleeve 140 may also be provided, via which the flame sensor 138 is permanently carried on the circumferential wall 62, and for providing an essentially gastight sealing. The opening 142 formed for the flowing of the ignition element 134 in the circumferential wall 62 and the opening 144 formed for the passage of the flame sensor 138 in the circumferential wall 62 are essentially in the same axial area, so that the ignition element 134 and the flame sensor 138 have essentially the same distance to the first bottom wall 106, wherein this distance can be measured, for example, in relation to the longitudinal central axis thereof in each case. As FIG. 8 shows this, the flame sensor 138 has somewhat shorter dimensions than the ignition element 134, so that the flame sensor ends, in case of essentially radial extension in relation to the housing longitudinal axis L, in the radial direction in front of this housing longitudinal axis L and is located at a spaced location from the ignition element 134.

The fuel gas inlet openings 132 are preferably arranged in coordination with the positioning of the ignition element 134 in the first bottom part 104 such that no fuel gas inlet openings 132 are provided in the area of the first bottom wall 106 covered by the ignition element 134. This may be achieved, for example, by the mutual distance of the fuel gas inlet openings 132 following one another in the circumferential direction, in case of a regular circular arrangement, being so great that the ignition element 134 can extend through between two directly adjacent fuel gas inlet openings 132 from radially outside. If, for example, such a great regular distance cannot be used because of the necessary density of the fuel gas inlet openings 132, it is possible to deviate from the regular arrangement pattern and the provision of fuel gas inlet openings can be dispensed with where the ignition element 134 axially overlaps the first bottom wall.

FIG. 8 shows that, for example, only a single air inlet opening 100 is provided in the circumferential wall 62 in that axial area, in which the openings 142 and 144 for the ignition element 134 or the flame sensor 138 are formed in the circumferential wall 62. The opening center thereof may be, for example, in the same axial area as the opening centers of the openings 142, 144. Thus, a ring 102 of air inlet openings 100 lying in the axial plane of the ignition element 134 or of the flame sensor 138 comprises, in the example shown, only a single such opening 100, but preferably at least fewer openings than one or more rings 102 provided in the axial direction at a greater distance to the first bottom wall 106. As a result, a lower quantity of air enters into the combustion chamber 60 in the axial area of the ignition element 134. This is especially advantageous in a preheating phase, which will be explained below, at the start of the combustion operation, during which the ignition element 134 is energized with air introduced into the combustion chamber 60 during the flushing thereof in order to heat this ignition element to a temperature needed for establishing ignition conditions. Because less combustion air enters into the combustion chamber 60 in the area of the ignition element 134, only a relatively small quantity of heat is also discharged by this combustion chamber, which makes possible a short preheating phase. Further, as a result of the reinforced introduction of air in an area located at a greater distance from the bottom area 64, the highest temperatures will also occur in an area located at a greater distance from the bottom area 64 during ongoing combustion. This reduces the thermal load especially of the flame sensor 138 during the combustion. However, because the flame sensor 138 is positioned very close to the ignition element 134, i.e., is positioned in an area, in which the combustion will start upon ignition of the mixture of air and fuel gas, it is capable of supplying information about the combustion start very rapidly and without considerable time delay.

Figure 4:
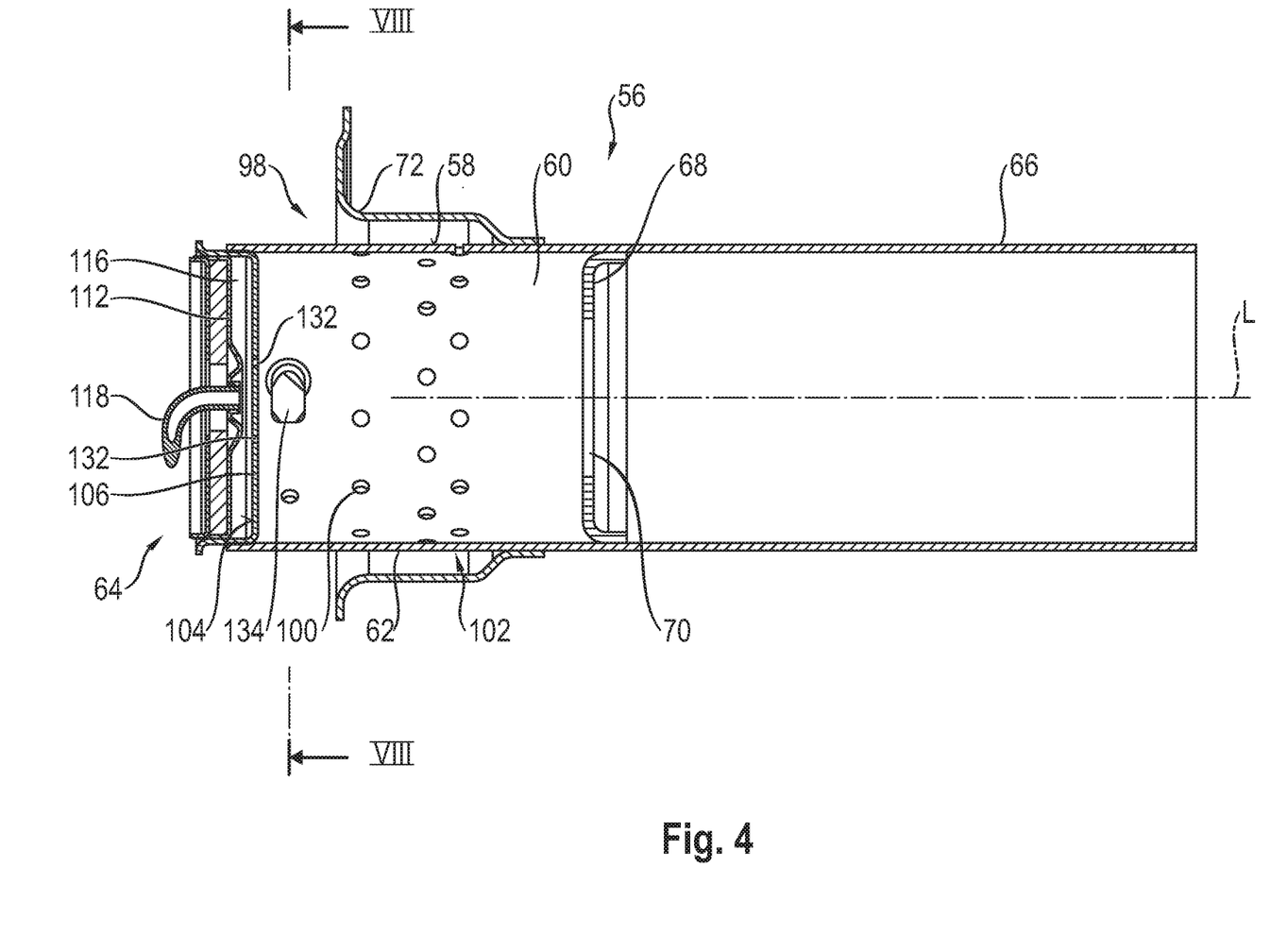
FIG. 4 is a longitudinal sectional view of a combustion chamber assembly unit of the vehicle heater of FIG. 3, cut in a plane containing a housing longitudinal axis.

In the configuration shown in FIGS. 3 and 4, a mixing of the fuel gas with the combustion air first takes place in the combustion chamber 60 itself. For safety reasons, provisions are preferably made for the air pressure, here, for example, the static pressure may be taken into consideration, to be higher especially in the air feed chamber 98 than the pressure, e.g., likewise the static pressure, of the fuel gas fed into the combustion chamber 60 during the operation of the vehicle heater 12. This may be achieved, for example, by setting the quantity of the air fed by the blower 86 and also the flow resistance for the air on the flow path in the direction of the combustion chamber 60. The occurrence of fuel gas leaks from the combustion chamber 60, for example, via the air inlet openings 100 or those areas, in which the ignition element 134 and the flame sensor 138 are carried on the circumferential wall 62, can thus be avoided. This is also supported by the flow resistance for the fuel gas introduced into the combustion chamber 60 via the waste gas flow path, i.e., through the flame tube 66, being lower than the flow resistance via the air inlet openings 100 into the air feed chamber 98. This is especially also significant in situations, in which, for example, an air flow into the combustion chamber 60 is not present in case of a failure of the blower 86 and thus in case of an initially still continued feed of fuel gas, there might be a risk that this fuel gas could be released via the air feed chamber 98.

Figure 9:
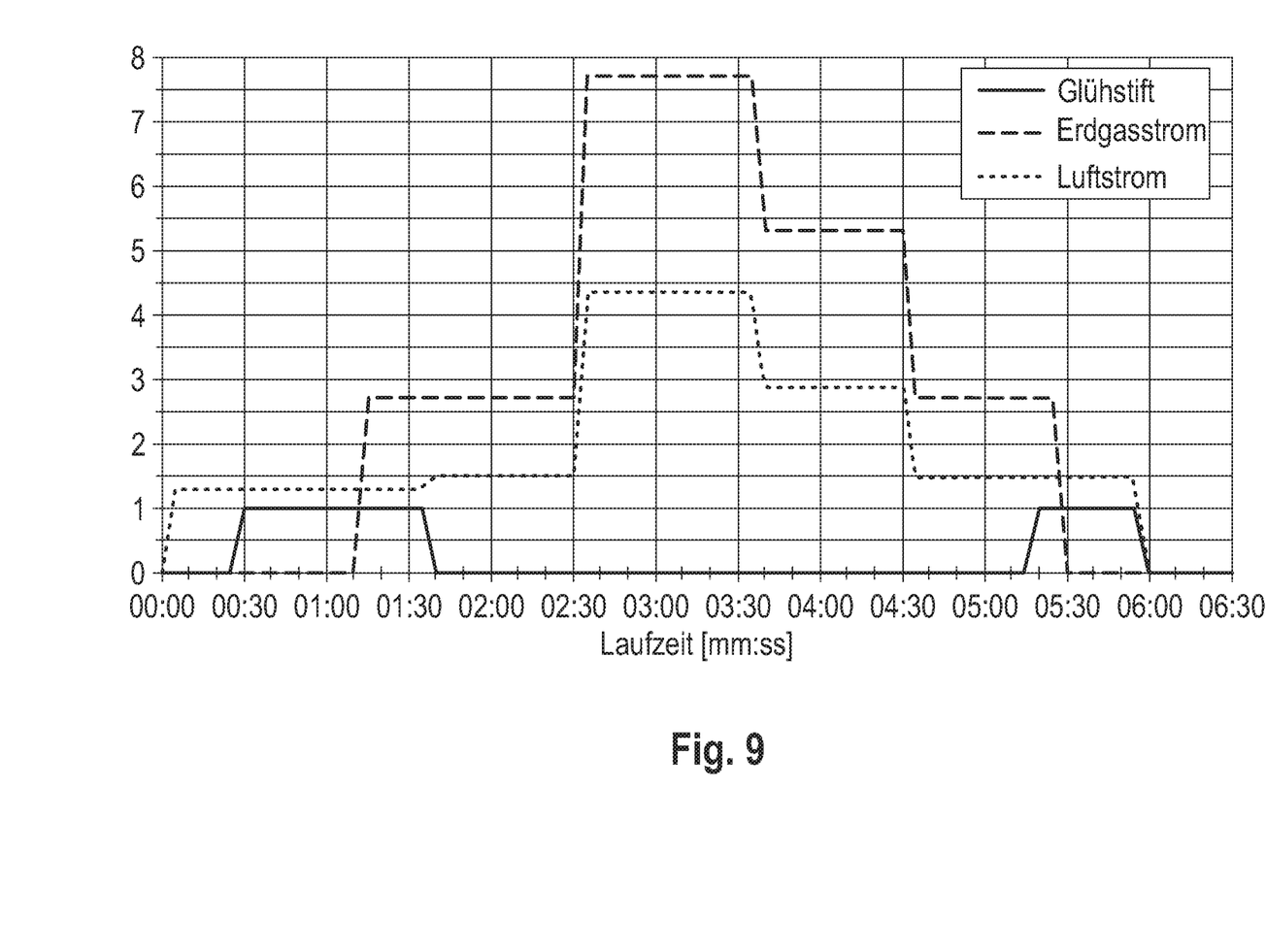
FIG. 9 is a time chart, which represents the operation of various system areas of the vehicle heater of FIG. 3 in the combustion operation.

The operation of the vehicle heater 12 to be operated with fuel gas is described below with reference to FIG. 9. In this case, it is assumed, for example, that a command for startup of the vehicle heater is generated at the time 00:00. With this command, the blocking valve 32 shown in FIGS. 1 and 2 can preliminarily be opened, provided that the blocking valve 20 is already opened. If both blocking valves 20, 32 are closed, the blocking valve 20 may first be opened and subsequently the blocking valve 32, or both blocking valves 20, 32 may be opened at the same time. The fuel gas quantity-setting valve assembly 42 remains, however, at first in a blocked state, so that no fuel gas 42 reaches the burner area 44.

With the generation of the start command, the blower 86 is put into operation, so that air is fed by the feed wheel 94 in the direction of the combustion chamber 60. Waste gas residues or combustion residues possibly still present in the combustion chamber 60 or the waste gas flow area lying downstream therefrom may thus be blown out of the vehicle heater 12. With some delay at the start of operation of the blower 86, the ignition element 134 is energized, so that this ignition element is heated in a preheating phase and ignition conditions, i.e., a sufficiently high temperature, are created in the area surrounding the ignition element 134. For example, under such ignition conditions, the ignition element 134 has a surface temperature in the range of 1,000° C. If these ignition conditions are present, which can be detected by the end of a predefined time, the fuel gas quantity-setting valve assembly is set in a released state, in which a quantity of fuel gas suitable for the start phase is fed. For example, this may be that quantity of gas, which may also be provided for a heating output level with the lowest heating output and can be fed in the exemplary embodiment of FIG. 1, for example, by switching the fuel gas quantity-setting valve 48 into its released position.

With the feed of fuel gas via the fuel gas feed chamber 116 into the combustion chamber 60, an ignitable mixture of air and fuel gas is generated there, and this mixture will ignite in the area of the ignition element 134. The ignition is detected by the flame sensor 138, which can input a corresponding signal into the actuating unit 52. For safety reasons, it is predetermined here that if it has not been detected that an ignition has occurred from the beginning of the fuel gas feed within a predefined time of, for example, approximately 10 seconds, the fuel gas feed is interrupted again in order to ensure that no excessive quantity of uncombusted fuel gas is discharged from the combustion chamber 60 or the vehicle heater 12. If no ignition is detected, then the air feed may, for example, be continued in order to flush the combustion chamber 60, and it is possible to proceed in the manner described above in an attempt to restart in order to ignite the mixture formed in the combustion chamber 60.

If an ignition occurs in the combustion chamber 60 within the time described above, energizing of the ignition element 134 can be ended. Here, provisions may be made, for example, for this ignition element 134 to no longer be energized automatically at the end of the above-described time of, for example, 10 seconds, because, in case no ignition is detected, the fuel feed is also ended. The ignition phase may thus by no means last longer than the above-described time of, for example, 10 seconds.

Because a rich mixture of fuel gas and air is generally provided in this ignition phase, i.e., the ignition takes place under fuel gas excess, after ignition has taken place in case of an initially equivalent quantity of fuel gas, the quantity of air is increased somewhat, which can take place, for example, by increasing the speed of the blower motor 88. Fuel gas and air are then fed, for example, in corresponding quantities necessary for providing the lowest heating output level in order to initially still bring about a flame stabilization over a time of a few seconds.

After the end of this stabilization phase, which may thus be, for example, an operating phase with the lowest heating output level, air and fuel gas are then fed, for example, with the quantities necessary for the heating output level with the highest heating output, because it is generally assumed that such a vehicle heater is then put into operation when various areas of a vehicle shall be heated as quickly as possible because of relatively lower ambient temperatures. For example, for this purpose, the speed of the blower motor 88 may be increased to a desired speed intended for this heating output level with the highest heating output, and in the case of the configuration shown in FIG. 1, the fuel gas quantity-setting valve 50 may also be brought into its released position.

If the maximum heating output is no longer needed, the heating output level having an average heating output may be selected, for example. For this purpose, the speed of the blower motor 88 and hence also of the feed wheel 94 may be decreased correspondingly. In order to reduce the quantity of fuel gas, the fuel gas quantity-setting valve 48 in the exemplary embodiment of FIG. 1 can be brought into its blocked position, so that fuel gas is only still fed via the fuel gas quantity-setting valve 50.

In order to further reduce the heating output, the air feed quantity can be reduced by decreasing the speed of the blower motor 89 and thus of the feed wheel 94 further. The fuel gas quantity-setting valve 50 can be brought into its blocked position to reduce the fuel gas feed quantity, while at the same time the fuel gas quantity-setting valve 48 providing a lower quantity is brought into its released position.

If the combustion operation of the vehicle heater shall be ended after approximately 5.5 minutes, the ignition element 134 is initially energized again in case of continued combustion air feed and fuel feed. If this ignition element has reached a sufficiently high temperature, which may be the case at the end of a predefined time of, for example, a few seconds, the fuel gas feed is ended, for example, by the fuel gas quantity-setting valve 48 also being brought into its blocked position. The air feed is first still continued in order to thus provide a mixture with decreasing fuel gas content and, supported by the energizing of the ignition element 134, in order to keep this mixture burning as long as possible. It is thereby ensured that even in the end phase of the combustion operation, the quantity of uncombusted, emitted fuel gas is as low as possible. It should be pointed out that the switching off phase can be shortened by the feed of fuel gas also being interrupted already with the generation of the switching off command and the energizing of the ignition element, possibly for avoiding overheating of the ignition element already before energizing the ignition element. Because the ignition element 134 is positioned close to that area, in which very high temperatures exist during ongoing combustion, the time, within which this ignition element reaches a sufficiently high temperature at the start of energizing for the support of the continued combustion, is markedly shorter than in the start phase of the combustion, during which the ignition element must be heated based on the generally relatively low ambient temperatures.

A predefined time after the generation of the switching off command, the feed of air may then also be ended by the energizing of the blower motor 88 also being set. The vehicle heater 12 is then in a state, in which the above procedure can be carried out again for resumption of the combustion operation.

While specific embodiments of the invention have been shown and described in detail to illustrate the application of the principles of the invention, it will be understood that the invention may be embodied otherwise without departing from such principles.

What is claimed is:

1. A fuel gas-operated vehicle heater comprising:
   a combustion chamber housing in a burner area, the combustion chamber housing having a combustion chamber formed therein, wherein the combustion chamber housing comprises a circumferential wall, extending in a direction of a housing longitudinal axis and radially outwardly defining the combustion chamber in relation to the housing longitudinal axis and the combustion chamber housing comprises a bottom area adjoining the circumferential wall and axially defining the combustion chamber, the bottom area comprising a first bottom wall and a second bottom wall axially spaced from the first bottom wall, wherein the bottom area has a fuel gas feed chamber axially defined between the first bottom wall and the second bottom wall, the combustion chamber and the fuel gas feed chamber being arranged following one another in a direction of the housing longitudinal axis, the first bottom wall being positioned axially between the fuel gas feed chamber and the combustion chamber;
   a fuel gas feed line opening into the fuel gas feed chamber at a fuel gas junction area in a radial central area of the second bottom wall for feeding fuel gas into the fuel gas feed chamber, an opening area being provided in a radial central area of the second bottom wall, the fuel gas feed line being inserted into the opening area; and
   a fuel gas inlet opening assembly provided in the first bottom wall for the entry of fuel gas from the fuel gas feed chamber into the combustion chamber, wherein no fuel gas inlet opening of the fuel gas opening assembly is located in a radial central area of the first bottom wall opposite the fuel gas junction area in the fuel gas feed chamber in the direction of the housing longitudinal axis;
   an air feed chamber enclosing the combustion chamber housing in an area of the circumferential wall, the air feed chamber receiving air from a blower, the circumferential wall having a plurality of air inlet openings provided therein for entry of air from the air feed chamber into the combustion chamber.

2. The vehicle heater in accordance with claim 1, wherein the fuel gas inlet opening assembly comprises a plurality of fuel gas inlet openings.

3. The vehicle heater in accordance with claim 2, wherein the fuel gas inlet openings are arranged essentially symmetrically in relation to the housing longitudinal axis.

4. The vehicle heater in accordance with claim 1, further comprising an ignition element, comprising a glow plug, extending essentially parallel to the first bottom wall and provided at an axially spaced location from the bottom area.

5. The vehicle heater in accordance with claim 4, wherein a density of a number of openings or an opening size or both a density of a number of openings and an opening size of the air inlet openings, in the axial area of the ignition element, is lower than in an axial area at a greater distance from the bottom area.

6. The vehicle heater in accordance claim 4, wherein the air inlet openings are arranged in at least one or a plurality of air inlet opening rings, each of the air inlet opening rings comprising at least one or a plurality of air inlet openings provided in various axial areas of the circumferential wall and following one another in the circumferential direction.

7. The vehicle heater in accordance with claim 5, wherein an air inlet opening ring provided in the axial area of the ignition element, has a lower number of air inlet openings than at least one air inlet opening ring provided at a greater distance from the bottom area.

8. The vehicle heater in accordance with claim 1, wherein a flame sensor or a temperature sensor extends essentially parallel to the first bottom wall and is provided at an axially spaced location from the bottom area.

9. The vehicle heater in accordance with claim 8, further comprising an ignition element extending essentially parallel to the first bottom wall, wherein the ignition element and the flame sensor are arranged at an essentially equal axial distance to the bottom area.

10. The vehicle heater in accordance with claim 1, further comprising:
    a flame diaphragm carried on the circumferential wall; or
    a flame tube connected to the circumferential wall or formed integral therewith; or
    any combination of a flame diaphragm carried on the circumferential wall, and a flame tube connected to the circumferential wall or formed integral therewith.

11. The vehicle heater in accordance with claim 8, further comprising a flame diaphragm carried on the circumferential wall, wherein an axial distance of the flame sensor to the bottom area is shorter than the axial distance of the flame sensor to the flame diaphragm.

12. The vehicle heater in accordance with claim 1, wherein:
    the bottom area comprises a first bottom part with the first bottom wall and a circumferential wall and a second bottom part with the second bottom wall and a circumferential wall and the second bottom part is inserted into the first bottom part and the two bottom parts are connected to one another in an area of the circumferential walls.

13. A fuel gas-operated vehicle heater comprising:
    a combustion chamber housing in a burner area, the combustion chamber housing having a combustion chamber formed therein, wherein the combustion chamber housing comprises a housing longitudinal axis and a circumferential wall, extending in a direction of the housing longitudinal axis and radially outwardly defining the combustion chamber in relation to the housing longitudinal axis, the combustion chamber housing further comprising a bottom area adjacent to the circumferential wall, the bottom area axially defining at least a portion of the combustion chamber, the bottom area comprising a first bottom wall and a second bottom wall, the first bottom wall being located at an axially spaced location from the second bottom wall with respect to the housing longitudinal axis, wherein at least a portion of the first bottom wall and at least a portion of the second bottom wall define a fuel gas feed chamber, the first bottom wall being located axially between the fuel gas feed chamber and the combustion chamber with respect to the housing longitudinal axis, the second bottom wall comprising a second bottom wall opening;

a fuel gas feed line opening into the fuel gas feed chamber for feeding fuel gas into the fuel gas feed chamber, wherein at least a portion of the fuel gas feed line is inserted in the second bottom wall opening;

a fuel gas inlet opening assembly provided in the first bottom wall for entry of fuel gas from the fuel gas feed chamber into the combustion chamber, the first bottom wall comprising a first bottom wall radial central area, the first bottom wall radial central area being area free of one or more fuel gas openings, wherein a delivery end of the fuel gas feed line is located opposite the first bottom wall central area in a direction of the housing longitudinal axis;

an air feed chamber surrounding the combustion chamber housing in an area of the circumferential wall, the circumferential wall having a plurality of air inlet openings for passing air from the air feed chamber into the combustion chamber.

14. The vehicle heater in accordance with claim 13, wherein the combustion chamber and the fuel gas chamber are arranged following one another in a direction of the housing longitudinal axis, the second bottom wall comprising a second bottom wall radial central area, the second bottom wall radial central area comprising the second bottom wall opening.

15. The vehicle heater in accordance with claim 13, wherein the combustion chamber is arranged directly adjacent to the fuel gas chamber.

16. The vehicle heater in accordance with claim 14, wherein the fuel gas inlet opening assembly comprises a plurality of the fuel gas inlet openings, the fuel gas inlet openings being arranged about the first bottom wall area.

17. A fuel gas-operated vehicle heater comprising:
a combustion chamber housing in a burner area, the combustion chamber housing having a combustion chamber formed therein, wherein the combustion chamber housing comprises a housing longitudinal axis and a circumferential wall, extending in a direction of the housing longitudinal axis and radially outwardly defining the combustion chamber in relation to the housing longitudinal axis, the combustion chamber housing comprising a bottom area adjoining the circumferential wall and axially defining at least a portion of the combustion chamber, the combustion chamber housing comprising a first bottom wall and a second bottom wall comprising a second bottom wall opening, the second bottom wall being located at an axially spaced location from the first bottom wall with respect to the housing longitudinal axis, wherein at least a portion of the first bottom wall and at least a portion of the second bottom wall define a fuel gas feed chamber, the first bottom wall being located axially between the fuel gas feed chamber and the combustion chamber with respect to the housing longitudinal axis;

a fuel gas feed line comprising a fuel gas feed line end portion, at least a portion of the fuel gas feed line end portion being arranged in the second bottom wall opening for feeding fuel gas into the fuel gas feed chamber;

a fuel gas inlet opening assembly provided in the first bottom wall for entry of fuel gas from the fuel gas feed chamber into the combustion chamber, the first bottom wall comprising a first bottom wall surface free of one or more fuel gas openings, wherein the fuel gas feed line is located opposite the first bottom wall surface in a direction of the housing longitudinal axis; and an air feed chamber surrounding the combustion chamber housing in an area of the circumferential wall, the circumferential wall having a plurality of air inlet openings for passing air from the air feed chamber into the combustion chamber.

18. The vehicle heater in accordance with claim 17, wherein the combustion chamber and the fuel gas chamber are arranged following one another in a direction of the housing longitudinal axis.

19. The vehicle heater in accordance with claim 18, wherein the fuel gas inlet opening assembly comprises a plurality of said fuel gas inlet openings, each of the fuel gas inlet openings being located adjacent to the first bottom wall surface, the first bottom wall surface being impermeable to the fuel gas.

20. The vehicle heater in accordance with claim 17, wherein the second bottom wall comprises a second bottom wall radial central area, the second bottom wall radial central area comprising the second bottom wall opening, the first bottom wall surface comprising a first bottom wall radial central area, the first bottom wall radial central area being located opposite the fuel gas feed line end portion, the first bottom wall surface is configured to deflect the fuel gas such that the fuel gas is distributed in the fuel gas chamber.

* * * * *